United States Patent [19]

Tcherkinsky et al.

[11] 4,051,121
[45] Sept. 27, 1977

[54] AZO PIGMENTS HAVING TWO 2-HALO-5-TRIFLUOROMETHYLPHENYL DIAZO COMPONENT RADICALS AND A BIS-(2-HYDROXYNAPHTHOYL-3-AMINO)-2,5-DIHALOBENZENE COUPLING COMPONENT RADICAL

[75] Inventors: Boris Tcherkinsky; Hans Wasem, both of Basel, Switzerland

[73] Assignee: Sandoz Ltd., Basel, Switzerland

[21] Appl. No.: 630,810

[22] Filed: Nov. 11, 1975

Related U.S. Application Data

[63] Continuation of Ser. No. 404,341, Oct. 9, 1973, abandoned.

[30] Foreign Application Priority Data

Oct. 13, 1973 Switzerland ............ 15036/73

[51] Int. Cl.$^2$ ............ C09B 33/14; C09B 43/12
[52] U.S. Cl. ............ 260/174; 260/184; 260/202
[58] Field of Search ............ 260/174, 177, 184, 187, 260/188

[56] References Cited

U.S. PATENT DOCUMENTS

| | | | |
|---|---|---|---|
| 2,741,658 | 4/1956 | Schmid et al. ............ | 260/174 |
| 3,262,925 | 7/1966 | Mueller et al. ............ | 260/174 |
| 3,562,249 | 2/1971 | Schnabel et al. ............ | 260/184 |
| 3,658,785 | 4/1972 | Ronco ............ | 260/174 |
| 3,691,149 | 9/1972 | Mueller et al. ............ | 260/174 |

FOREIGN PATENT DOCUMENTS

| | | | |
|---|---|---|---|
| 61,580 | 5/1968 | Germany ............ | 260/174 |
| 1,903,649 | 10/1969 | Germany ............ | 260/188 |

*Primary Examiner*—Charles F. Warren
*Attorney, Agent, or Firm*—Gerald D. Sharkin; Richard E. Vila; Melvyn M. Kassenoff

[57] ABSTRACT

Disclosed are pigments of the formula I,

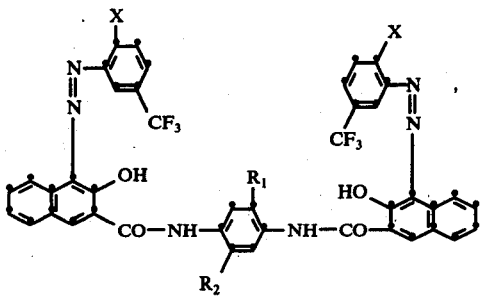

in which the X's, $R_1$ and $R_2$, independently, signify a fluorine, chlorine or bromine atom. They are useful, for example, for the pigmentation of synthetic polymers in the mass, in emulsion paints, printing inks and viscose and cellulose acetate spinning solutions and for dyeing paper in the stock.

13 Claims, No Drawings

AZO PIGMENTS HAVING TWO 2-HALO-5-TRIFLUOROMETHYLPHENYL DIAZO COMPONENT RADICALS AND A BIS-(2-HYDROXYNAPHTHOYL-3-AMINO)-2,5-DIHALOBENZENE COUPLING COMPONENT RADICAL

This application is a continuation of application Ser. No. 404,341, filed Oct. 9, 1973 and now abandoned.

The invention relates to azo compounds free from sulphonic acid groups.

The invention provides compounds of formula I,

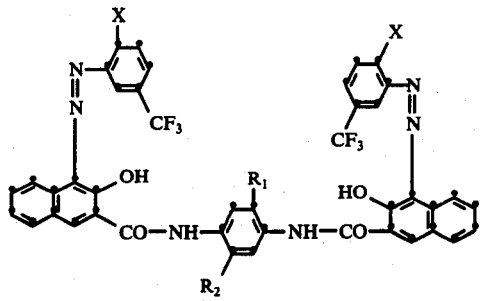

in which the X's, $R_1$ and $R_2$, independently, signify a fluorine, chlorine or bromine atom.

In the compounds of formula I, the X's preferably signify chlorine or bromine. The X's are preferably the same. $R_1$ and $R_2$, independently, preferably signify chlorine or bromine. $R_1$ and $R_2$ are preferably the same. More preferably, $R_1$ and $R_2$ are the same and are chloro or bromo. Also more preferably, the X's are the same and are chloro or bromo. The preferred compounds of formula I are those wherein each of $R_1$ and $R_2$ is independently chloro or bromo, and each X is independently chloro or bromo or the two X's are identical.

The invention also provides a process for the production of a compound of formula I, stated above, characterised by a. condensing a compound of formula II,

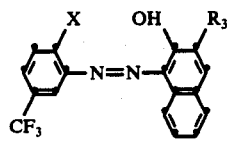

in which
X is as defined above, and
$R_3$ signifies a carboxyl group or a functional derivative thereof, with a diamine of formula III,

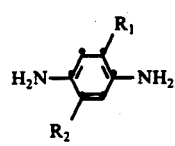

in which $R_1$ and $R_2$ are as defined above, in an inert organic solvent, or b. coupling a diazotised amine of formula IV,

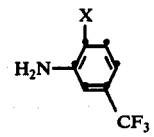

in which X is as defined above, with a compound of formula V,

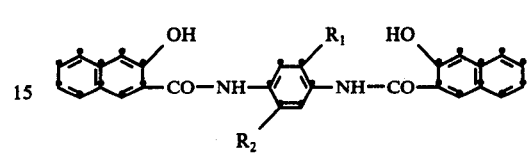

in which $R_1$ and $R_2$ are as defined above.

Processes a) and b) are carried out in conventional manner.

In process a), where $R_3$ signifies a functional derivative of a carboxyl group, examples of such derivatives include the low molecular weight esters, e.g. the $C_{1-4}$ alkyl esters, and the acid halides, particularly the acid bromide or chloride and preferably the acid chloride. Process a) is preferably carried out in an anhydrous organic solvent, preferably in an aromatic solvent. Where, as is preferred, $R_3$ signifies an acid halide radical, the condensation of the compound of formula II with the compound of formula III is advantageously carried out in the presence of an acid binding agent such as anhydrous alkali-metal acetates, bicarbonates or carbonates or organic bases such as pyridine. Where $R_3$ signifies the free acid, the reaction is preferably carried out in the presence of a condensation agent such as phosphorus trichloride.

In process a), the mol ratio of the compound of formula III to the compound of formula II is preferably 2:1.

The production of compounds of formula II, in which $R_3$ signifies an acid chloride or bromide, may be carried out by reacting the corresponding free acid with phosphorus chlorides, bromides or thionyl chloride, in conventional manner, preferably in an aromatic solvent such as toluene, nitrobenzene or a chlorobenzene, optionally in the presence of dimethylformamide or dimethylacetamide and at temperatures up to the boiling point of the reaction mixture.

Process b) is preferably carried out in a pH 4-6 buffered solution of the diazonium compound by slow addition of the diamide of formula V dissolved in alkaline medium. The preferred mol ratio of compound IV to compound V is 2:1.

The resulting compound of formula I may be isolated and purified in conventional manner, isolation from the reaction medium being easily carried out due to the poor solubility of the compounds in aqueous medium and organic solvents.

The compounds of formula II, employed in process a) may be obtained by coupling the diazotized amine of formula IV, stated above, with 2-hydroxy-3-carboxynaphthalene, where desired the free acid group in the resulting compound being converted into a functional derivative thereof in conventional manner.

The compounds of formula V, employed in process b) may be obtained by condensing 2-hydroxy-3-carboxynaphthalene, or a functional derivative thereof as described above, with a diamine of formula III, above, in analogous manner to process a), described above.

The compounds of formula I are indicated for use as pigments. The compounds are particularly suitable for the pigmentation of synthetic polymeric materials in the mass, in the presence or absence of solvents, particularly after having been conditioned in the normal methods for pigments, the incorporation of the compounds in the materials being carried out in conventional manner. By synthetic polymeric material is to be understood synthetic polymers and resins such as polyethylene, polystyrene, polyvinyl chloride, synthetic rubber and synthetic leathers. The compounds are also suitable for use in emulsion paints and other surface coatings in an oil, water or solvent base, in printing inks and in viscose and cellulose acetate spinning solutions for the production of spundyed filaments. The compounds can also be used for dyeing paper in the stock prior to sheet formation and for printing and coating textiles.

The dyeings obtained have notable migration and light fastness properties, together with notable fastness to overspraying and solvents and notable transparency and heat stability characteristics. The last named property permits the use of the pigments in the pigmentation of polyvinyl chloride and polypropylene in the mass followed by extruding or otherwise shaping the polymer at elevated temperatures.

The following Examples, in which all parts and percentages are by weight and temperatures in degrees Centigrade, illustrate the invention.

EXAMPLE 1

41.5 Parts of dry monoazocarboxylic acid of to formula

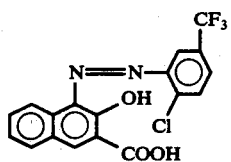

obtained by coupling diazotized 4-chloro-3-aminobenzo-trifluoride with 2-hydroxynaphthalene-3-carboxylic acid, are heated in 480 parts of ortho-dichlorobenzene and 18 parts of thionyl chloride for 4 hours at 105°–110° with stirring. Subsequently, the solution is cooled to 70°–80° and the excess thionyl chloride, together with some ortho-dichlorobenzene, is distilled off under vacuum. To the remaining solution, 8.9 parts of 2,5-dichloro-para-phenylenediamine are added and the solution is heated for 15 hours at 140°–145° with stirring. The pigment precipitates as insoluble, fine-crystalline particles. The pigment is filtered off while still warm, washed with hot ortho-dichlorobenzene, then with methanol and finally with water and then vacuum dried at 80°. The pigment obtained has the formula

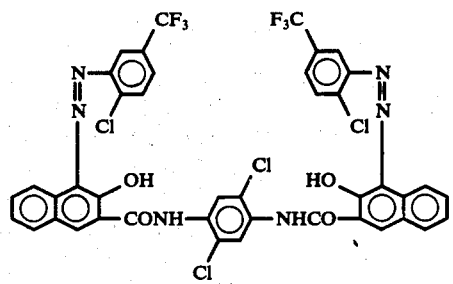

EXAMPLE 2

3.6 Parts of sodium nitrite are introduced into 50 parts of sulphuric acid with stirring, the temperature is raised to 60°–70°. When the sodium nitrite is dissolved, 12 parts of 3-amino-4-bromobenzotrifluoride are added dropwise at 20°–25° and the mixture stirred for a further 2 hours. It is then discharged onto ice and water and filtered. 13 Parts of N,N'-bis-(2'-hydroxy-3'-naphthoyl)-2,5-dichloro-1,4-diaminobenzene are dissolved in 250 parts of methanol and 20 parts of 30% sodium hydroxide solution at 20°–25°. Subsequently, over a period of 30 minutes, the diazo solution is run in. With simultaneous addition of 30% sodium hydroxide solution the pigment suspension is kept alkaline. On completion of the coupling reaction the pigment suspension is acidified, heated to 80°–90°, filtered off and the precipitate washed with hot water and then vacuum dried at 70°. The pigment obtained has the formula

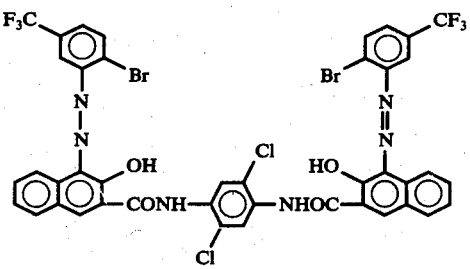

To improve the properties, the red pigment may be heated, for example for 30 minutes at 140° in a solvent such as mono-, di- or tri-chlorobenzene, nitrobenzene or dimethylformamide. On synthetic polymers it gives dyeings of red shade with notable fastness properties.

Further pigments of formula I, which are obtainable in accordance with the procedures of Examples 1 and 2 and which have the same notable fastness properties as the pigment of Example 1, are listed in the following Table.

| Example No. | $R_1$ | $R_2$ | X | Shade in PVC |
| --- | --- | --- | --- | --- |
| 3 | Br | Br | Br | red |
| 4 | Cl | Cl | F | " |
| 5 | Br | Br | Cl | " |

APPLICATION EXAMPLE 0.5 Parts of the pigment produced according to Example 1, and 5 parts of titanium dioxide white pigment are intimately mixed with 100 parts of moulding material consisting of:
83 parts of a polyvinyl chloride emulsion
32 parts of a dioctyl phthalate plasticizer 3 parts of a commercial epoxide plasticizer
1.5 parts of a commercial stabilizer (barium-cadium complex)
0.5 parts of a commercial chelator.

For improved pigment distribution, the mixture is worked for 8 minutes on a roller mill set at 160°, with one roller rotating at 20 r.p.m. and the other at 25 r.p.m. to exert friction. Subsequently, it is extruded as film of 0.3 mm thickness. The film is pigmented in a slight bluish red shade which as notable light and migration fastness and is heat stable.

What is claimed is:

1. A compound of the formula

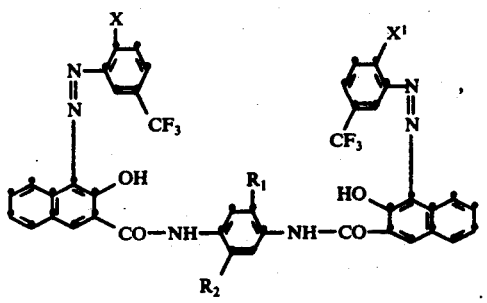

wherein each of X, X', $R_1$ and $R_2$ is independently fluoro, chloro or bromo.

2. A compound according to claim 1 wherein each of $R_1$ and $R_2$ is independently chloro or bromo.

3. A compound according to claim 2 wherein $R_1$ and $R_2$ are identical.

4. A compound according to claim 2 wherein each of X and X' is independently chloro or bromo.

5. A compound according to claim 2 wherein X and X' are identical.

6. A compound according to claim 1 wherein $R_1$ and $R_2$ are identical.

7. A compound according to claim 1 wherein X and X' are identical.

8. A compound according to claim 1 wherein each of X and X' is independently chloro or bromo.

9. A compound according to claim 8 wherein X and X' are identical.

10. The compound according to claim 9 wherein each of X, X', $R_1$ and $R_2$ is chloro.

11. The compound according to claim 9 wherein each of X and X' is bromo, and each of $R_1$ and $R_2$ is chloro.

12. The compound according to claim 9 wherein each of X, X', $R_1$ and $R_2$ is bromo.

13. The compound according to claim 9 wherein each of X and X' is chloro, and each of $R_1$ and $R_2$ is bromo.